US010355807B2

(12) United States Patent
Kühne et al.

(10) Patent No.: US 10,355,807 B2
(45) Date of Patent: Jul. 16, 2019

(54) JAMMING DEVICE AND JAMMING METHOD

(71) Applicant: Rohde & Schwarz GmbH & Co. KG, München (DE)

(72) Inventors: Jens Kühne, Ebersberg (DE); Thomas Schmid, Munich (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 0 days.

(21) Appl. No.: 15/969,991

(22) Filed: May 3, 2018

(65) Prior Publication Data
US 2018/0351689 A1 Dec. 6, 2018

(30) Foreign Application Priority Data

Jun. 2, 2017 (EP) .................................... 17174125
Aug. 2, 2017 (EP) .................................... 17184499

(51) Int. Cl.
*H04K 3/00* (2006.01)
*H04B 1/715* (2011.01)

(52) U.S. Cl.
CPC ............... *H04K 3/45* (2013.01); *H04B 1/715* (2013.01); *H04K 3/42* (2013.01); *H04K 3/92* (2013.01)

(58) Field of Classification Search
None
See application file for complete search history.

(56) References Cited

U.S. PATENT DOCUMENTS

| | | | | |
|---|---|---|---|---|
| 7,606,524 B1* | 10/2009 | Frank | ...................... | H04K 3/42 455/1 |
| 8,543,053 B1* | 9/2013 | Melamed | .................. | H04K 3/43 455/1 |
| 2003/0103589 A1* | 6/2003 | Nohara | ................... | H04B 1/713 375/350 |
| 2006/0140251 A1* | 6/2006 | Brown | .................. | H04B 1/7143 375/135 |
| 2009/0209196 A1 | 8/2009 | Haverty | | |
| 2009/0214205 A1* | 8/2009 | Clark | ....................... | H04K 3/42 398/39 |
| 2009/0311963 A1 | 12/2009 | Haverty | | |
| 2013/0315341 A1* | 11/2013 | Couillard | ................. | H04K 3/80 375/285 |
| 2016/0344510 A1* | 11/2016 | Shishkin | ................... | H04K 3/80 |

OTHER PUBLICATIONS

Extended European search report for European Patent Application No. 17174125.9, dated Nov. 24, 2017, 7 pages.
Extended European search report for European Patent Application No. 17184499.6, dated Feb. 2, 2018, 6 pages.

* cited by examiner

*Primary Examiner* — Fayyaz Alam
(74) *Attorney, Agent, or Firm* — Westman, Champlin & Koehler, P.A.

(57) ABSTRACT

The present invention provides a jamming device for jamming a frequency hopping signal, the jamming device comprising at least one receiving antenna configured to receive signals in the signal spectrum of the frequency hopping signal, an emission detection unit configured to detect relevant emissions in the received signals that pertain to the frequency hopping signal, and an effectivity analysis unit configured to determine and output the effectivity of the emission detection unit based on the number of detected relevant emissions and an expected number of relevant emissions of the frequency hopping signal. Further, the present invention provides a respective jamming method.

14 Claims, 4 Drawing Sheets

JAMMING DEVICE AND JAMMING METHOD

CROSS-REFERENCE TO RELATED APPLICATIONS

The present application claims priority to European Patent Application No. 17174125.9, filed on Jun. 2, 2017, and European Patent Application No. 17184499.6, filed on Aug. 2, 2017, the contents of which are hereby incorporated by reference in their entirety.

TECHNICAL FIELD

The present invention relates to a jamming device for jamming a frequency hopping signal. The present invention further relates to a respective jamming method.

BACKGROUND

Although applicable in principal to any system that is used to jam wireless signals, the present invention and its underlying problem will be hereinafter described in combination with FHSS jammers.

In frequency-hopping spread spectrum or FHSS systems, radio signals are transmitted by rapidly switching a carrier among many frequency channels. The switching of the frequency channels is usually based in a pseudorandom sequence known to both transmitter and receiver. FHSS systems therefore spread their signal over rapidly changing frequencies. An available frequency band may e.g. be divided into sub-frequencies. The emitted signals may then rapidly change or hop among these sub-frequencies in a pre-determined order.

FHSS signals are e.g. used in first generation WLAN systems, in Bluetooth systems and in especially in the free 2.4 GHZ frequency spectrum e.g. by radio control devices for model vehicles, like e.g. aircraft and drones.

Especially the application of FHSS modulation to remote controlled drones and aircraft may pose a problem in situations or areas that do not allow flying such aircraft or drones. It may for example be prohibited to fly model aircraft or drones near an airport for safety reasons. With other modulation methods, the emitter or controller signals may easily be jammed, since the relevant frequencies are known. However, with FHSS modulating transmitters, it is difficult to track the relevant emissions.

To jam such FHSS signals e.g. of model drones, the full frequency spectrum may therefore be jammed. This however also blocks the frequency spectrum for any other use. If only the relevant sections of the frequency band may be jammed, a so called following jammer may be used that tries to anticipate or rapidly follow any frequency hop and only jams the relevant frequencies. However, with following jammers, it is difficult to measure the success rate of the following jammer.

SUMMARY

Against this background, there is the need to provide an improved control method for wireless jammers.

According to a first aspect, a jamming device is provided for jamming a frequency hopping signal, also called frequency hopping spread spectrum signal or FHSS signal, the jamming device comprising at least one receiving antenna configured to receive signals in the signal spectrum of the frequency hopping signal, an emission detection unit configured to detect relevant emissions in the received signals that pertain to the frequency hopping signal, and an effectivity analysis unit configured to determine and output the effectivity of the emission detection unit based on the number of detected relevant emissions and an expected number of relevant emissions of the frequency hopping signal.

According to a first aspect, a jamming method is provided for jamming a frequency hopping signal, the jamming method comprising receiving signals in the signal spectrum of the frequency hopping signal, detecting relevant emissions in the received signals that pertain to the frequency hopping signal, and determining and outputting the effectivity of the emission detection unit based on the number of detected relevant emissions and an expected number of relevant emissions of the frequency hopping signal.

The present invention is based on the finding that it is very difficult for a user to determine the success rate prior or during use of a following jammer.

The present invention therefore provides a jamming device that determines the effectiveness of the jamming procedure. This is done based on the number of relevant emissions that the emission detection unit detects in relation to the number of relevant emissions that are expected for the FHSS signal. Since the jamming device may be used with FHSS signals and during jamming operation will follow the frequency hops of the FHSS signal, the jamming device may also be called a "following jammer". In contrast to predictive jammers that try to predetermine the frequency hops of the FHSS signal, a following jammer will generate the jamming signal based on detected relevant emissions.

The term relevant emission refers to any emission that is part of the FHSS signal or that the emission detection unit asserts to be part of the FHSS signal. Regarding the FHSS signal the relevant emissions will therefore be part of the FHSS signal. However, regarding the emission detection unit, the term refers to every emission that the emission detection unit determines to be part of the original FHSS signal.

The number of relevant emissions that are expected for the FHSS signal may be determined based on predefined or known parameters or properties of the FHSS signal. For example a user of the jamming device may set the parameters of the FHSS signal prior to starting the jamming process. If for example the jamming device is used to stop drones from flying over an airport's air space, a user may visually identify the drone and look up the respective parameters for the specific drone. For this purpose a data base may be provided that e.g. comprises the parameters for all known types of drones. In such a database for example the hop rate for the FHSS signal may be provided. Alternatively the hop rate may be set by a user of the jamming device.

If the hop rate is known, the effectivity analysis unit may determine the number of different emissions that the FHSS signal comprises for a predetermined amount of time. At the same time the emission detection unit detects emissions in the received signals that may pertain to or be part of the FHSS signal. However, the emission detection unit may not accurately detect 100% of the emissions that pertain to the frequency hopping signal. The emission detection unit may especially miss some of the relevant emissions of the FHSS signal and only detect a sub-sample of all relevant emissions of the FHSS signal.

If for example for a predetermined amount of time the FHSS signal should contain 100 emissions and the emission detection unit only detects 65 relevant emissions, the effectivity will be $65/100=0.65$ or 65%.

This information may be used by the operator of the jamming device prior to starting the jamming operation to adjust the parameters for the FHSS signal in the emission detection unit and improve the jamming operation. This is especially useful in cases where the emitter of the jamming device should not be localized easily. In such cases the user will want to make sure that the maximum effectivity of the jamming device is available prior to giving away the emitter position by starting the jamming process.

On the other hand the effectivity value that is calculated by the effectivity analysis unit may also be used during a running jamming operation to adjust the parameters in order to improve the jamming operation.

Summing up, with the present invention it becomes possible to estimate the rate of success of a jamming device prior to starting the jamming operation or to adjust the operation of the jamming device during the jamming operation. The effectivity may be determined without the need to monitor the device controlled by the FHSS signal or the user of the emitter of the FHSS signal.

Further, the monitoring may e.g. be used to detect substantial changes in the FHSS signal, e.g. the timing or frequency channels. Such changes may hint at the user of the emitter trying to evade the jamming. The user of the jamming device may therefore be informed e.g. with a warning signal about changes in the effectivity of the jamming that may be the result of such changes of the FHSS signal.

Further embodiments of the present invention are subject of the further subclaims and of the following description, referring to the drawings.

In a possible embodiment, the emission detection unit may be configured to sequentially detect relevant emissions based on an amount of energy that is present in the received signals for specific frequency channels.

The emission detection unit may try to detect relevant emissions by selecting specific frequency channels and determining the energy that is provided in the frequency channels. A frequency channel may e.g. be characterized by the center frequency and a width. The frequency channels may e.g. be selected by the emission detection unit based on a predetermined set of parameters that are predefined for the FHSS signal, as indicated above e.g. by a user of the jamming device.

The emission detection unit may e.g. perform the detection in the digital domain. To this end the emission detection unit may comprise an analog to digital converter or receive the received signals in digitized form and perform respective signal processing on the digital received signal. The signal processing may e.g. comprise performing a Fourier Transform, especially a Fast-Fourier-Transform and detecting the energy transported in the received signal for specific frequencies or frequency bins. An alternative (exclusive or parallel) to a Fast-Fourier-Transform may be a polyphaser filter bank or a digital down converter (DDC) filter bank. The DDC filter bank has the advantage that the channels need not be equidistant.

If the emission detection unit detects a required energy in a frequency channel, the emission detection unit may qualify this emission, e.g. the energy in the respective frequency channel, as relevant emission and provide the information about the relevant emission and/or a total number of detected relevant emissions to the effectivity analysis unit.

In a possible embodiment, the emission detection unit may be configured to detect the relevant emission based on a predefined set of configurable parameters, wherein the parameters may comprise a frequency band and/or frequency channel center frequencies for the frequency channels and/or widths for the frequency channels and/or timing information about the frequency channel changes of the frequency hopping signal and/or a minimum energy threshold value for detecting a relevant emission in a frequency channel.

As already indicated above, the emission detection unit may be parameterized to correctly or effectively identify the relevant emissions.

The emission detection unit may e.g. be provided with the relevant frequency band or range that has to be analyzed. This may narrow down the frequency band to be analyzed and reduce computational load. Further, the parameters may comprise information about the frequency channels that are used by the FHSS signal. Such information may e.g. comprise the width of the single frequency channels and/or the center frequencies of the frequency channels. Another valuable information is timing information that allows the emission detection unit to determine when another emission starts or ends. With this information the emission detection unit may determine when to search for a new relevant emission.

The minimum energy threshold may e.g. be set by a user or automatically based on the monitored FHSS signal prior to setting this parameter. The minimum energy threshold allows differentiating the relevant emissions from other signals or noise that may be present in the respective frequency channel.

It is understood, that the above parameters may e.g. be provided by a user of the jamming device.

In a possible embodiment, the jamming device may comprise a signal analyzer that is configure to analyze the received signal and determine the configurable parameters or at least some of the configurable parameters based on the received signal.

The signal analyzer may e.g. be provided as a signal processor that may e.g. record the received signal and perform the respective analysis. The signal processor may e.g. record at least one cycle or more of the FHSS signal. A cycle of the FHSS signal refers to a complete sequence of frequency or channel hops that is repeated by the emitter of the FHSS signal over and over during transmission of the FHSS signal. With the recording of at least one complete cycle the signal analyzer may determine properties of the FHSS signal, like e.g. the timing of the frequency or channel hops, the sequence of frequency channels that are used by the FHSS signal and the channel width of the frequency channels. The signal analyzer may also determine the signal strength, i.e. the energy of the signal, in the single frequency channels to set the minimum energy threshold appropriately.

If the emitter of the FHSS signal does e.g. not use a repeating channel sequence the other parameters, like e.g. the channel width, the channel frequencies and the hop rate or hop timing may already prove valuable to the emission detection unit.

An exemplary FHSS signal may e.g. comprise signal bursts of 1 ms duration in changing frequency channels and interruptions of about 100 μs between the bursts.

The emission detection unit may without knowing the exact channel sequence e.g. simply monitor in the relevant frequency channels at the relevant times for transmitted energy that is above the predetermined energy threshold. Therefore, with the emission detection unit even with an unknown channel sequence of the FHSS signal, the analysis may be concentrated on the relevant frequency channels at the relevant times.

In a possible embodiment, the signal analyzer may be configured to tune at least the minimum energy threshold value for detecting a relevant emission in a frequency channel such that the number of detected relevant emissions is approximately equal, especially equal, to the expected number of relevant emissions.

The signal analyzer may e.g. simulate the detection rate of the emission detection unit based on the detected parameters regarding the frequencies and timing of the FHSS signal. The signal analyzer may then in the simulation step-wise reduce the minimum energy threshold value starting from the maximum value of the minimum energy threshold value. The signal analyzer may stop reducing the minimum energy threshold value as soon as the number of detected relevant emissions is approximately equal or equal to the expected number of relevant emissions. Approximately may refer to the effectivity being higher than e.g. 80% or 90% or 95%. The final minimum energy threshold value may then be provided to the emission detection unit for use as the threshold during the jamming operation.

It is understood, that the signal analyzer may determine the parameters for the emission detection unit prior to starting the jamming operation and/or continuously during the jamming operation.

In a possible embodiment, the emission detection unit may be configured to detect relevant emissions based on the start and/or end timing of an emission in the received signals.

As already indicated above the emission detection unit may possess information about the timing details of the FHSS signal. If the emission detection unit detects an emission it may therefore determine the start and end time and compare that times with the timing details or information of the FHSS signal. An emission may immediately be discarded for being irrelevant if the timing does not match the timing details of the FHSS signal.

In a possible embodiment, the emission detection unit may be configured to detect relevant emissions based on a predetermined hop sequence for the frequency hopping signal.

As already indicated above, the hop sequence of the frequency hopping signal may either be determined based on a monitoring of the frequency hopping signal or be retrieved from a database. With this information it is very simple for the emission detection unit to discard emissions for being irrelevant, if a detected emission is in another channel than the channel that should actually be used for the FHSS signal.

This information may further be used to reduce the computational load in the emission detection unit. The emission detection unit may e.g. only analyze the frequency channel that is used in the respective moment in time by the FHSS signal for a respective emission.

In a possible embodiment, the at least one receiving antenna may comprise at least one directional antenna and the emission detection unit may be configured to detect relevant emissions based on a bearing and/or a position of the received signal.

The directional antenna may e.g. receive signals with a specific directivity. This means that signals are received by the antenna with higher signal levels from a specific direction. As an alternative the directional antenna may provide information about the bearing of the signal source of the received signal. This allows the emission detection unit to assess whether a signal is provided approximately from the direction of the emitter of the FHSS signal or not. Signals that are provided from completely different directions may therefore be disregarded as not being relevant or originating from another emitter.

If more than one directional antennas are provided in the jamming device the position of the emitter of the FHSS signal may be accurately determined. The position may e.g. be determined using triangulation techniques. This is also possible if non-directional antennas are provided and the time of travel of the FHSS signal to the different antennas is analyzed.

In one embodiment, the jamming device may comprise a display device configured to output the effectivity, i.e. to display a representation of the effectivity value. The display may e.g. comprise a bargraph, a decimal value, a color indication, e.g. green for high effectivity, yellow for medium effectivity and red for low effectivity like a traffic light. The display may also comprise a tachometer-like indication or a pictogram that e.g. changes size with respect to the effectivity.

The display may also comprise an audible output, like e.g. a beeping sound that changes its frequency respective to the effectivity, e.g. high frequency for high effectivity and low frequency for low effectivity.

Although not explicitly mentioned, it is understood that the jamming device may comprise a signal emitter for emitting jamming signals. The emitter may e.g. emit a jamming signal for every detected relevant emission in the received signal. That jamming signal may then be adapted accordingly regarding the timing, the frequency and the bandwidth.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

Figure 1:
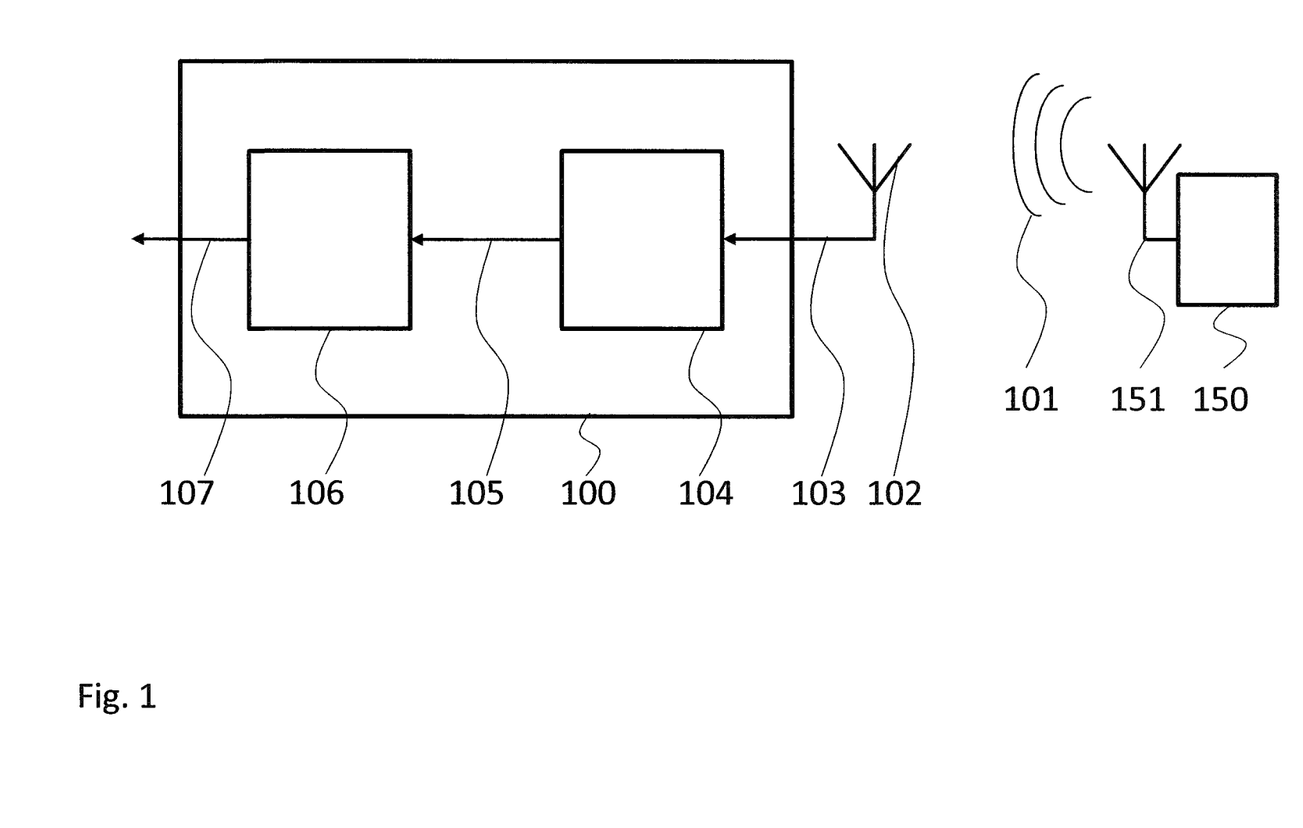
FIG. 1 shows a block diagram of an embodiment of a jamming device according to the present invention.

FIG. 1 shows a block diagram of a jamming device 100 for jamming a frequency hopping signal 101 that may be emitted by an emitter 150 via an antenna 151. The emitter 150 may e.g. be a remote control unit for controlling a remote controlled drone. The jamming device 100 comprises a receiving antenna 102. It is understood, that although only one receiving antenna 102 is shown, the jamming device 100 may comprise any number of receiving antennas. The receiving antenna 102 is coupled to an emission detection unit 104 that is coupled to an effectivity analysis unit 106.

The receiving antenna 102 receives the frequency hopping signal 101 and provides the received signal 103 to the emission detection unit 104. The emission detection unit 104 analyses the received signal 103 and identifies relevant emissions 105 in the received signal 103. Relevant emissions 105 in this regard may be single burst emissions emitted by the emitter 150 in a single frequency channel. The frequency hopping signal 101 may be seen as a sequence of such burst emissions.

The emission detection unit 104 then provides an information about the detected relevant emissions 105 to the effectivity analysis unit 106. The effectivity analysis unit 106 calculates the relation of the relevant emissions 105 to the relevant emissions that are expected for the frequency hopping signal 101.

It is understood, that the effectivity analysis unit 106 requires at least a minimal knowledge about the frequency hopping signal 101. The minimum information about the frequency hopping signal 101 that is required is the hop rate or number of frequency hops per time unit.

If for example the frequency hopping signal 101 comprises 1000 hops per second and the emission detection unit 104 detects 850 hops per second, the effectivity of the detection of the relevant emissions 105 is $850/1000=0.85$ or 85%. This effectivity not only refers to the effectivity of the detection of relevant emissions 105. Since a jamming emitter (not shown, see e.g. FIG. 3) will only emit a jamming signal for detected relevant emissions 105, the jamming effectivity will also be 85% for the above example.

The emission detection unit 104 may use different parameters of the received signal 103 to determine if the signal contains a relevant emission 105. Possible parameters may include, but are not limited to, a specific frequency band, frequency channel center frequencies, widths for the frequency channels, timing information about the frequency channel changes or hops of the frequency hopping signal 101, and a minimum energy threshold value for detecting a relevant emission 105 in a frequency channel.

The emission detection unit 104 may e.g. only analyze signals in the relevant frequency band based on the frequency channel center frequencies and the widths for the frequency channels. The emission detection unit 104 may also take into account the timing of the frequency hopping signal 101 by comparing the start and/or end timing of an emission in the received signal 103 with the start and end times of the bursts as configured by the respective parameter. The emission detection unit 104 may further take into account a predetermined hop sequence for the frequency hopping signal 101 by looking for relevant emissions 105 only in the frequency channel that is active according to the configured sequence.

The above parameters may e.g. be set by a user of the jamming device 100. Below an embodiment with an automatic determination of these parameters or at least some of the parameters will be presented.

Figure 2:
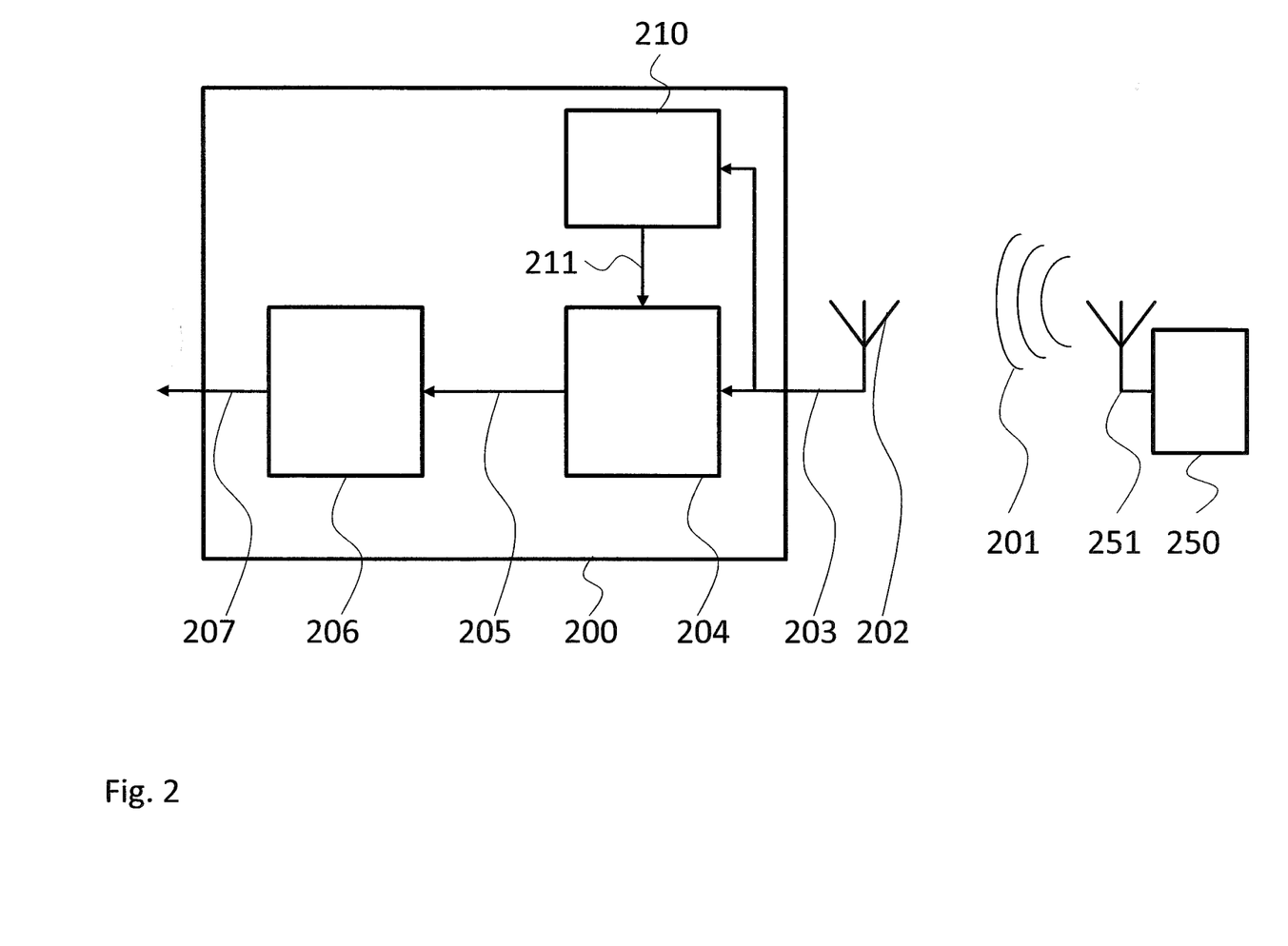
FIG. 2 shows a block diagram of another embodiment of a jamming device according to the present invention.

FIG. 2 shows a block diagram of another jamming device 200. The jamming device 200 is based on the jamming device 100. Therefore, the jamming device 200 also comprises a receiving antenna 202 that is coupled to an emission detection unit 204. The emission detection unit 204 is coupled to the effectivity analysis unit 206. In principle, the jamming device 200 works as explained above for the jamming device 100. However in addition, the jamming device 200 comprises a signal analyzer 210.

The signal analyzer 210 analyzes the received signal 103 and determines the configurable parameters 211 based on the received signal 103. The signal analyzer 210 may e.g. record the frequency hopping signal 201 or the received signal 203 and perform the analysis prior to starting a jamming operation of the jamming device 200. In addition, the signal analyzer 210 may perform the analysis on-line, i.e. during a jamming operation of the jamming device 200. This allows adapting the parameters 211 to changing properties of the frequency hopping signal 201 quickly.

As already indicated, possible parameters 211 are a specific frequency band, frequency channel center frequencies, widths of the frequency channels, timing information about the frequency channel changes or hops of the frequency hopping signal 101, and a minimum energy threshold value for detecting a relevant emission 105 in a frequency channel.

The signal analyzer 210 may e.g. work in an offline mode and in an online mode. In the offline mode, the signal analyzer 210 will analyze parameters like e.g. at least one of the frequency band, the frequency channel center frequencies, the widths of the frequency channels, and timing information about the frequency channel changes or hops of the frequency hopping signal 101. This information may advantageously be used by the emission detection unit 204 to select the part of the received signal 203 that has to be analyzed for the occurrence of a relevant emission 205. The emission detection unit 204 will then look for signal energy that is above the minimum energy threshold value for detecting a relevant emission 205 in a frequency channel.

In an online mode, the signal analyzer 210 may e.g. permanently tune the minimum energy threshold value for detecting a relevant emission 205 in a frequency channel, such that the number of detected relevant emissions 205 is approximately equal or equal to the expected number of relevant emissions 205. This for example allows adapting the minimum energy threshold value if the emitter 250 is a moving emitter. The signal analyzer 210 may also continue to analyze all other relevant parameters 211.

Figure 3:
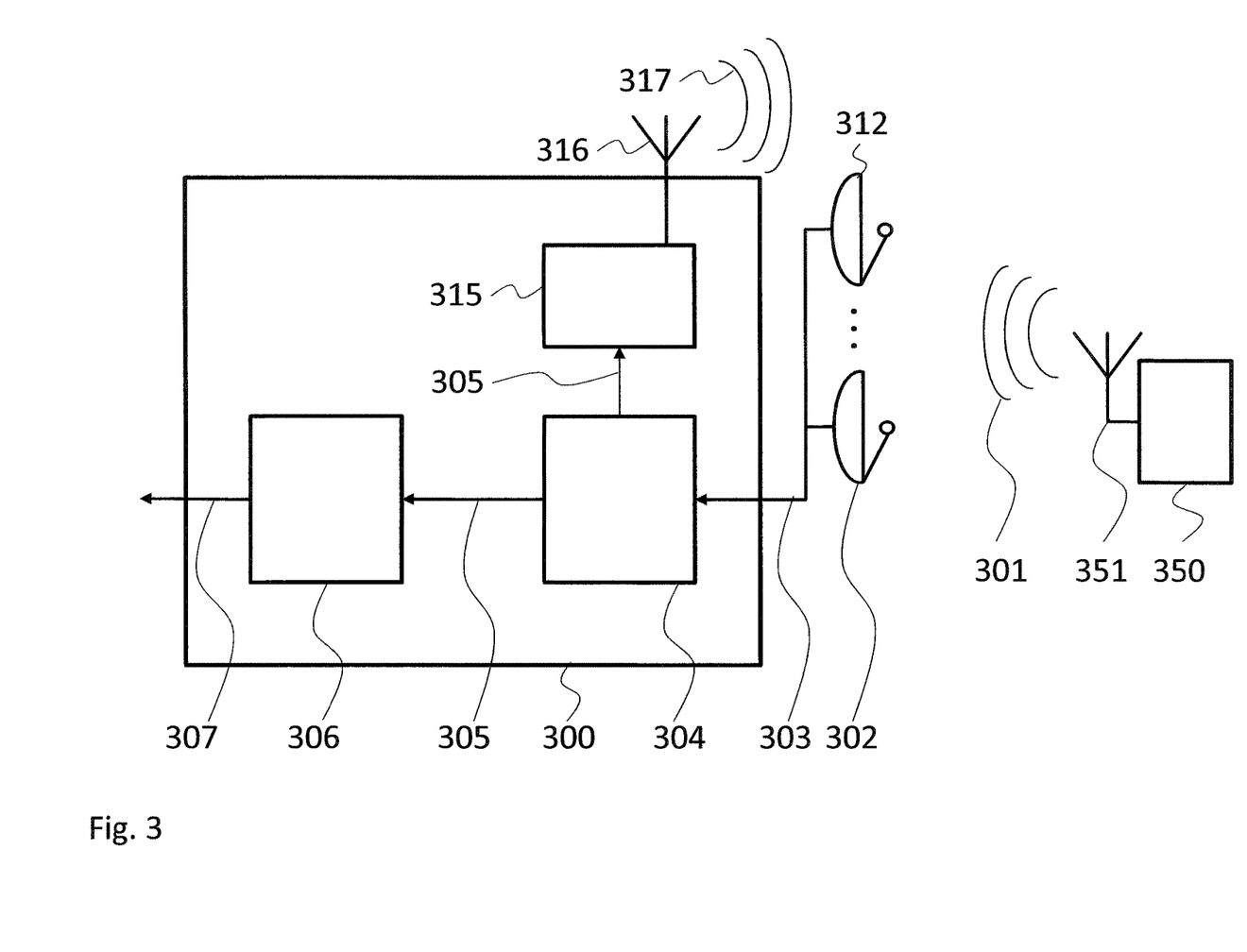
FIG. 3 shows a block diagram of another embodiment of a jamming device according to the present invention.

FIG. 3 shows a block diagram of another jamming device 300. The jamming device 300 is based on the jamming device 100. Therefore, the jamming device 300 also comprises an emission detection unit 304 that is coupled to the effectivity analysis unit 306. In contrast to the jamming device 100 the jamming device 300 comprises a plurality of directional antennas 302, 312. Although only two directional antennas 302, 312 are shown, more directional antennas are hinted at by three dots.

The directional antennas 302, 312 allow the emission detection unit 304 to determine the bearing of the received signal 303, wherein a single directional antenna 302 may be provided in such an embodiment. The emission detection unit 304 may e.g. disregard any signal that does not originate from the direction at which the emitter 350 is positioned.

With more than one directional antenna 302, 312 the position of the emitter 350 may be determined and the emission detection unit 304 may e.g. only regard signals that originate from the position of the emitter 350 as possibly being a relevant emission 305.

The jamming device 300 further comprises a signal generator 315 that is coupled to the emission detection unit 304 and also receives the information about the relevant emissions 305. The signal generator 315 then generates a jamming signal 317 that is emitted by the emitting antenna 316. The signal generator 315 may generate the jamming signal as high energy burst that comprises the frequency of the detected relevant emission 305 and is limited to the channel bandwidth of the single channels of the frequency hopping signal 301.

Although the signal generator 315 and the emitting antenna are only shown in FIG. 3, it is understood that the jamming device 100 and the jamming device 200 will usually also comprise a signal generator and an antenna for emitting a jamming signal.

For sake of clarity in the following description of the method based FIG. 4 the reference signs used above in the description of apparatus based FIGS. 1-3 will be maintained.

Figure 4:
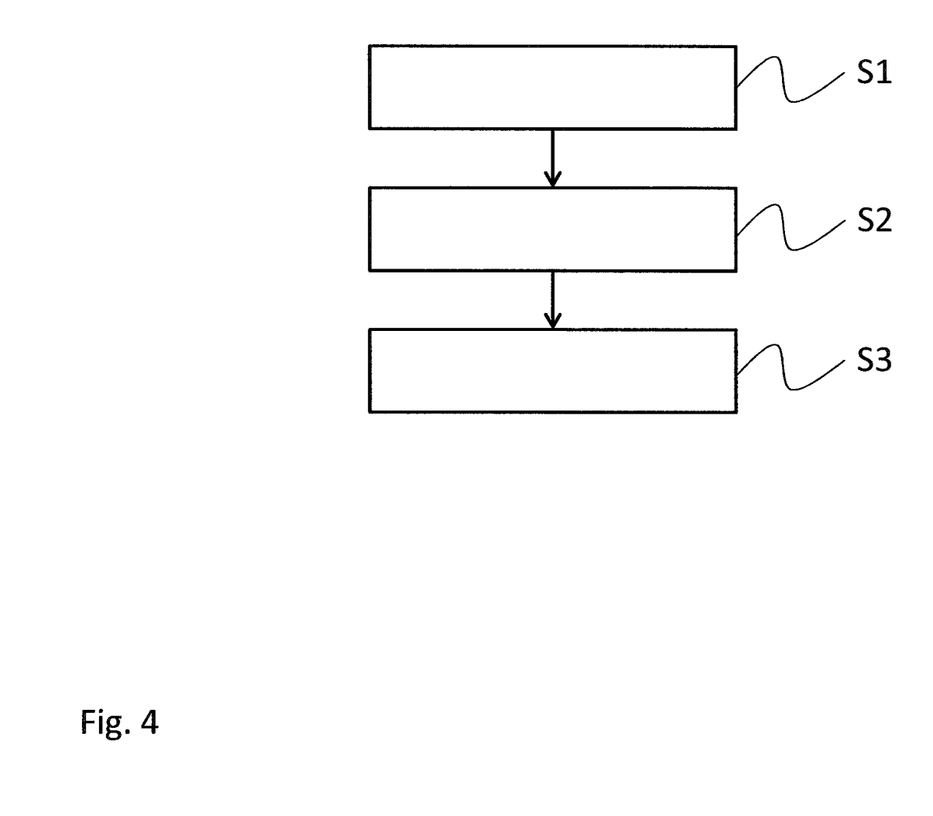
FIG. 4 shows a flow diagram of an embodiment of a jamming method according to the present invention.

FIG. 4 shows a flow diagram of a jamming method for jamming a frequency hopping signal 101, 201, 301.

The jamming method comprises receiving S1 signals in the signal spectrum of the frequency hopping signal 101, 201, 301. In addition, relevant emissions 105, 205, 305 are detected in the received signals 103, 203, 303 that pertain to the frequency hopping signal 101, 201, 301. Finally, the effectivity 107, 207, 307 of the emission detection unit 104, 204, 304 is determined and output based on the number of detected relevant emissions 105, 205, 305 and an expected number of relevant emissions 105, 205, 305 of the frequency hopping signal 101, 201, 301.

Detecting S2 may be performed sequentially or repeatedly based on an amount of energy that is present in the received signals 103, 203, 303 for specific frequency channels. For example a parameter may be defined with a minimum energy threshold value for detecting a relevant emission 105, 205, 305 in a frequency channel.

For identifying the single frequency channels detecting S2 may be performed based on a predefined set of configurable parameters 211. Such configurable parameters 211 may e.g. comprise a frequency band, frequency channel center frequencies for the frequency channels, widths of the frequency channels and e.g. timing information about the frequency channel changes or hops of the frequency hopping signal 101, 201, 301. The above parameters 211 may e.g. be determined by analyzing the received signal 103, 203, 303 prior and/or during a jamming operation.

Determining the parameters may comprises tuning at least the minimum energy threshold value for detecting a relevant emission 105, 205, 305 in a frequency channel such that the number of detected relevant emissions 105, 205, 305 is approximately equal, especially equal, to the expected number of relevant emissions 105, 205, 305.

In addition detecting S2 may comprise detecting relevant emissions 105, 205, 305 based on the start and/or end timing of an emission in the received signals 103, 203, 303, and/or based on a predetermined hop sequence for the frequency hopping signal 101, 201, 301.

Detecting S2 may also comprise detecting relevant emissions 105, 205, 305 based on a bearing and/or a position of the received signal 103, 203, 303.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 jamming device
101, 201, 301 frequency hopping signal
102, 202, 302, 312 receiving antenna
103, 203, 303 received signal
104, 204, 304 emission detection unit
105, 205, 305 relevant emissions
106, 206, 306 effectivity analysis unit
107, 207, 307 effectivity
210 signal analyzer
211 parameters
315 signal generator
316 emitting antenna
317 jamming signal
150, 250, 350 emitter
151, 251, 351 frequency hopping signal
S1-S3 method steps

What we claim is:

1. A jamming device for jamming a frequency hopping signal, the jamming device, comprising:
at least one receiving antenna configured to receive signals in the signal spectrum of the frequency hopping signal,
an emission detection unit configured to detect relevant emissions in the received signals that pertain to the frequency hopping signal, wherein the emission detection unit is configured to detect the relevant emissions based on a predefined set of configurable parameters,
an effectivity analysis unit configured to determine and output the effectivity of the emission detection unit based on the number of detected relevant emissions and an expected number of relevant emissions of the frequency hopping signal, and a signal analyzer that is configure to analyze the received signals and determine the configurable parameters based on the received signals, wherein the signal analyzer is configured to tune at least a minimum energy threshold value for detecting a relevant emission in a frequency channel such that the number of detected relevant emissions is equal or approximately equal to the expected number of relevant emissions.

2. The jamming device of claim 1, wherein the emission detection unit is configured to sequentially detect relevant emissions based on an amount of energy that is present in the received signals for specific frequency channels.

3. The jamming device of claim 1, wherein the parameters comprise at least one of:
a frequency band;
frequency channel center frequencies for the frequency channels;
widths for the frequency channels;
timing information about the frequency channel changes of the frequency hopping signal;
a minimum energy threshold value for detecting a relevant emission in a frequency channel.

4. The jamming device of claim 2, wherein the emission detection unit is configured to detect relevant emissions based on the start or end timing of an emission in the received signals.

5. The jamming device of claim 2, wherein the emission detection unit is configured to detect relevant emissions based on a predetermined hop sequence for the frequency hopping signal.

6. The jamming device of claim 1, wherein the at least one receiving antenna comprises at least one directional antenna and wherein the emission detection unit is configured to detect relevant emissions based on a bearing or a position of the received signal.

7. The jamming device of claim 1, wherein the jamming device comprises a display device configured to output the effectivity.

8. A jamming method for jamming a frequency hopping signal, the jamming method comprising:
receiving signals in the signal spectrum of the frequency hopping signal,
detecting relevant emissions in the received signals that pertain to the frequency hopping signal, wherein detecting relevant emissions in the received signals is performed based on a predefined set of configurable parameters,
analyzing the received signals and determining the configurable parameters based on the received signals,
determining and outputting the effectivity of the emission detection unit based on the number of detected relevant emissions and an expected number of relevant emissions of the frequency hopping signal,
wherein determining relevant emissions in the received signals comprises tuning at least a minimum energy thresh-old value for detecting a relevant emission in a frequency channel such that the number of detected relevant emissions is equal or approximately equal to the expected number of relevant emissions.

9. The jamming method of claim 8, wherein detecting relevant emissions in the received signals comprises sequentially detecting relevant emissions based on an amount of energy that is present in the received signals for specific frequency channels.

10. The jamming method of claim 8, wherein the configurable parameters comprise at least one of:
a frequency band;
frequency channel center frequencies for the frequency channels;
widths for the frequency channels;
timing information about the frequency channel changes of the frequency hopping signal;
a minimum energy threshold value for detecting a relevant emission in a frequency channel.

11. The jamming method of claim 8, wherein detecting comprises detecting relevant emissions based on the start or end timing of an emission in the received signals.

12. The jamming method of claim 8, wherein detecting comprises detecting relevant emissions based on a predetermined hop sequence for the frequency hopping signal.

13. The jamming method of claim 8, wherein detecting comprises detecting relevant emissions based on a bearing or a position of the received signal.

14. The jamming method of claim 8, wherein the jamming method comprises outputting the effectivity on a display device.

* * * * *